United States Patent
Rao

(10) Patent No.: US 11,323,563 B1
(45) Date of Patent: May 3, 2022

(54) TECHNIQUES FOR VETTING INBOUND CALLS IN A TELECOMMUNICATION NETWORK

(71) Applicant: Bandwidth, Inc., Raleigh, NC (US)

(72) Inventor: Srikanth Rao, Cary, NC (US)

(73) Assignee: Bandwidth Inc., Raleigh, NC (US)

( * ) Notice: Subject to any disclaimer, the term of this patent is extended or adjusted under 35 U.S.C. 154(b) by 0 days.

(21) Appl. No.: 17/480,372

(22) Filed: Sep. 21, 2021

(51) Int. Cl.
| | |
|---|---|
| *H04M 3/436* | (2006.01) |
| *H04M 3/42* | (2006.01) |
| *H04L 65/1076* | (2022.01) |
| *H04L 65/10* | (2022.01) |
| *H04L 61/2503* | (2022.01) |

(52) U.S. Cl.
CPC ........ *H04M 3/436* (2013.01); *H04L 61/2503* (2013.01); *H04L 65/1006* (2013.01); *H04M 3/42102* (2013.01)

(58) Field of Classification Search
CPC .............. H04M 3/436; H04M 3/42102; H04L 65/1006; H04L 61/2503
USPC ......................................................... 455/415
See application file for complete search history.

(56) References Cited

U.S. PATENT DOCUMENTS

| | | | |
|---|---|---|---|
| 10,979,565 B1 * | 4/2021 | Piscopo, Jr. .......... | H04W 80/10 |
| 2009/0323677 A1 * | 12/2009 | Mehmood ........... | H04L 65/1036 370/352 |
| 2020/0304546 A1 * | 9/2020 | Chavez ............. | H04M 3/42059 |

* cited by examiner

*Primary Examiner* — Ahmad F. Matar
*Assistant Examiner* — Jirapon Intavong
(74) *Attorney, Agent, or Firm* — Gregory Stephens

(57) ABSTRACT

Techniques are described for vetting unwanted calls. At an inbound customer call handling apparatus, a SIP INVITE is received from a destination carrier servicing the inbound customer intended for a destination user agent (UA) device of the inbound customer. The SIP INVITE includes a current origination identifier (ORIG ID) comprised of a fixed length character string. The call handling apparatus accesses a database of stored ORIG ID character strings, each stored ORIG ID character string in the database having been included with a previous SIP INVITE that has been previously associated with an unwanted inbound call. The call handling apparatus analyzes the current ORIG ID character string to determine if it matches any stored ORIG ID character strings in the database. When there is a match to a stored ORIG ID character string, the SIP INVITE is not forwarded to the destination UA device. Otherwise, it is forwarded to the destination UA device.

9 Claims, 4 Drawing Sheets

100

100

200

300

US 11,323,563 B1

TECHNIQUES FOR VETTING INBOUND CALLS IN A TELECOMMUNICATION NETWORK

TECHNICAL FIELD

Examples described herein are generally related to techniques for utilizing an origination identification header associated with an inbound telephone call to determine how the inbound call should be managed.

BACKGROUND

There is currently an epidemic of spam, nuisance, robocalling, and even fraudulent calls inflicted on virtually anyone with a phone and reachable by its associated telephone number. Recently, the Federal Communications Commission (FCC) with cooperation from stakeholders in the telecommunications industry developed and advanced regulations and standards that attempt to deal with the aforementioned problems.

The culmination of this cooperation is the development and mandatory adoption of what has been termed the STIR/SHAKEN framework to combat spoofed calls using a Caller ID authentication process. A spoofed call is one in which the Caller ID presented to the recipient has been amended in some manner usually in an attempt to obscure the actual identity of the caller. STIR/SHAKEN is a framework of interconnected standards. STIR/SHAKEN are acronyms for the Secure Telephone Identity Revisited (STIR) and Signature-based Handling of Asserted Information Using toKENs (SHAKEN) standards. This means that calls traveling through interconnected telecommunication networks would have their caller ID "signed" as legitimate by originating carriers and validated by other carriers before reaching end users. STIR/SHAKEN digitally validates the handoff of phone calls passing through the complex web of networks, allowing the telecom service provider of the end user receiving the call to verify that a call is in fact from the number displayed on Caller ID.

STIR/SHAKEN represents an improvement allowing anyone receiving a phone call to have confidence as to the legitimacy of the telephone number appearing in the Caller ID field. However, STIR/SHAKEN does not explicitly address verified telephone calls that are nevertheless undesired. For instance, the Caller ID field for an incoming call may be 919-497-4487 which the originating carrier has digitally signed as authentic and the terminating carrier has verified—thereby meeting the STIR/SHAKEN requirements. The number may be assigned to an entity that is making telephone calls in a legal manner but may nevertheless be unwanted to most people generally.

In such cases, there is still no mechanism for weeding out the unwanted calls beyond individual blacklists which can be tedious for an end user to administer. Moreover, the blacklist may not always be effective as the "caller" may utilize multiple originating telephone numbers when making the unwanted calls. Blacklists focus solely on the telephone number making the call not necessarily the source behind the number.

What is needed are techniques to determine if an inbound call can be analyzed to determine if it is likely associated with an unwanted or undesired call.

SUMMARY

In some embodiments, techniques are described for vetting inbound calls. In one embodiment, there is a method described in which an inbound customer call handling apparatus receives a SIP INVITE from a destination carrier servicing the inbound customer intended for a destination user agent (UA) device of the inbound customer. The SIP INVITE includes a current origination identifier (ORIG ID) comprised of a fixed length character string. The call handling apparatus accesses a database of stored ORIG ID character strings, each stored ORIG ID character string in the database having been included with a previous SIP INVITE that has been previously associated with an unwanted inbound call. The call handling apparatus analyzes the current ORIG ID character string to determine if it matches any stored ORIG ID character strings in the database. When there is a match to a stored ORIG ID character string, the SIP INVITE is not forwarded to the destination UA device. Otherwise, it is forwarded to the destination UA device.

The ORIG ID character string may be created by an originating carrier responsible for sending the SIP INVITE on behalf of a UA device that originated the SIP INVITE. The ORIG ID character string may further be the result of a hashing algorithm used to generate the fixed length character string based on a specified set of inputs. The specified set of inputs may include one or more of a customer name, an Internet Protocol (IP) address indicative of the point of ingress into the originating carrier's network, and an ID indicative of the UA device that initiated the SIP INVITE.

When the SIP INVITE associated with the current ORIG ID character string that resulted in a completed call turned out to be an unwanted call, the call handling apparatus may add the current ORIG ID character string to the database of stored ORIG ID character strings.

Another embodiment may include a computer system comprising one or more processors and a non-transitory computer readable medium to store a set of instructions executable by the one or more processors, the set of instructions to cause the one or more processors to carry out the method.

Still another embodiment may include a non-transitory computer readable medium to store a set of instructions executable by one or more processors, the set of instructions to cause the one or more processors to carry out the method.

DETAILED DESCRIPTION

Figure 1:
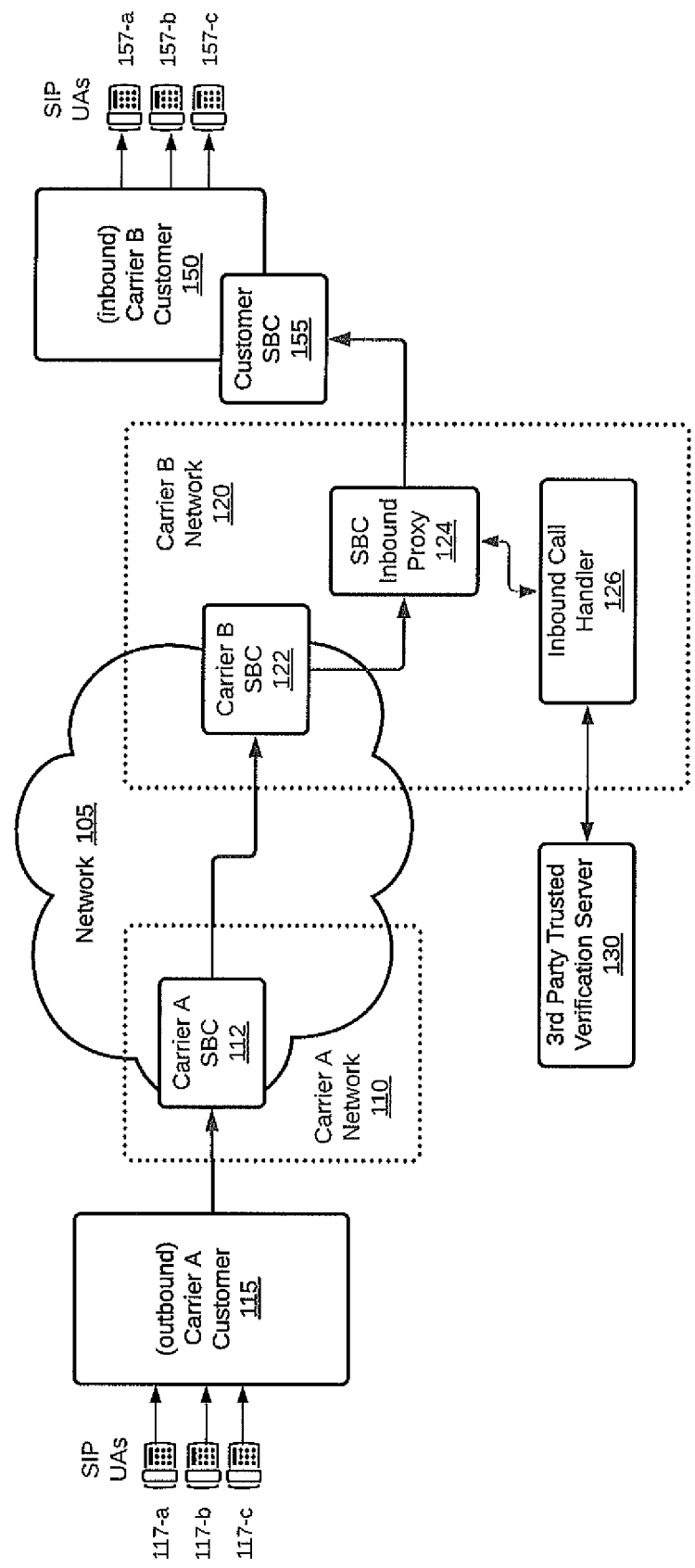
FIG. 1 illustrates an example network architecture according to an embodiment.

Various embodiments may include a system, method, apparatus, and/or computer program product that describe and claim techniques to vet inbound calls traversing one or more interconnected telecommunication networks.

As previously mentioned, STIR/SHAKEN represents an improvement allowing anyone receiving a phone call to have confidence in the legitimacy of the telephone number appearing in the Caller ID field. However, STIR/SHAKEN does not explicitly address verified telephone calls that are nevertheless undesired. The techniques described herein provide a further ability to vet an inbound telephone call to determine its source and whether the call is likely to concern subject matter the called party is specifically uninterested in receiving.

Calls placed by end users are forwarded to an originating carrier where they are subjected to the STIR/SHAKEN process. STIR/SHAKEN uses digital certificates, based on common public key cryptography techniques, to ensure the calling number of a telephone call is secure. Each telephone service provider or carrier obtains their digital certificate from a certificate authority who is trusted by other carriers. The certificate technology enables the called party to verify that the calling number is accurate and has not been spoofed.

In practice, a SIP INVITE is received by the originating carrier. A SIP INVITE is the signaling message used by the session initiation protocol (SIP) to place a call. The originating carrier checks the call source and calling number to determine how, to attest for the validity of the calling number (e.g., the 'from' number). There are three attestation levels: full—level A, partial—level B, and gateway—level C. Full attestation (A) means the carrier has authenticated the calling party and they are authorized to use the calling number. An example of this case is a subscriber registered with the originating carrier. Partial attestation (B) means the carrier has authenticated the call origination, but cannot verify the call source is authorized to use the calling number. An example of this use case is a telephone number behind an enterprise PBX. Gateway attestation (C) means the carrier has authenticated from where it received the call, but cannot authenticate the call source. An example of this case would be a call received from an international gateway.

The originating carrier uses an authentication server to create a SIP identity header. The authentication server could be, for instance, a third-party service hosted in the cloud, a software application integrated with the carrier's softswitch, or a session border controller (SBC). The SIP Identity header contains the following data: calling number (From); called number (To); current timestamp; attestation level; STIR/SHAKEN certificate URL; and origination identifier—hereinafter ORIG ID.

The SIP INVITE with the SIP identity header is sent to the terminating carrier. The SIP INVITE with identity header is then passed to the verification service that obtains the digital certificate of the originating carrier from the public certificate repository and begins a multi-step verification process. If all verification steps are successful, then the calling number has not been spoofed. The verification service then returns the results to the terminating carrier's softswitch or SBC and the call may be completed to the called party.

The techniques of the present invention go beyond the STIR/SHAKEN framework to provide for additional vetting of a call using one of the other components of the SIP identity header, namely, the ORIG ID. More broadly, the terminating carrier can offer to share much of the data resulting from the STIR/SHAKEN process to its customer/end user in an effort to further vet incoming calls.

The ORIG ID is an identifier constructed by the originating carrier that essentially identifies the ingress point of the call to the originating carrier's network. By abstraction, the originating carrier can use the ingress point to identify the source of the call (e.g., customer) and even the specific endpoint (e.g., UA—user agent) used to make the call.

According to the embodiments described herein, telecommunication network customers may be given the ability to choose the information they want to receive for inbound calls to their account. This information may include the ORIG ID.

The inbound customer can request its carrier to forward the ORIG ID with all inbound calls (i.e., as part of the SIP INVITE). The inbound customer may also maintain an unwanted traffic database of ORIG IDs for known unwanted calls. A called party will know if a received call is unwanted after the fact.

The general idea is to allow the called party to analyze the ORIG ID of known unwanted calls. Thereafter, inbound calls that have the same ORIG ID can be rejected, re-routed or otherwise handled (e.g., sent to voicemail) without completing the call to the end user. The ORIG ID is a hashed value meaning that whatever components may be included to create the ORIG ID are fed to a hashing algorithm that will return a fixed length character string. So long as the values for the components comprising a call are the same, the hashing algorithm will generate the same ORIG ID each time a call is made. If any component value is changed, the hashing algorithm will generate a completely different ORIG ID.

An example ORIG ID hashing scheme is presented for illustrative purposes. There are any number of variants to the hashing scheme that will achieve the same result that one of ordinary skill in the art can readily appreciate. Hypothetical examples of ORIG IDs may be presented herein solely for illustrative purposes. In general, the ORIG ID may be used primarily to identify the ingress point of a SIP INVITE into the originating carrier's network. This may comprise, for example, three distinct components: a customer ID, an IP address, and a user agent (UA) ID. Consider the following as input to the hashing algorithm for creating a USER ID for a SIP INVITE: Cust=XYZ,IPADD=192.168.105.7, UAID=23. A hashed USER ID may be returned that looks like this: jghf7hh9005476pds376. However, changing even one component, even slightly, will cause the ORIG ID to look dramatically different. For instance, using Cust=XYZ, IPADD=192.168.105.7,UAID=22 may return a hashed USER ID that looks like this: 3diyjhg944k4raa4mn78.

The hashed ORIG IDs may be characterized as 1-way meaning you cannot reverse engineer or decompile a ORIG ID into its original components. At the same time, the hashing algorithm will generate the exact same ORIG ID every time provided the input(s) to the hashing algorithm are identical. In order for the originating carrier to be able to associate ORIG IDs with their original components, the originating carrier must maintain a database of each unique combination of components and their respective hashed ORIG IDs. That way, when presented solely with a ORIG ID, the originating carrier can look it up in the database to see what combination of components created that ORIG ID.

The ORIG ID example described above was comprised of three components. That is merely a design choice. The number and combination of components may vary depending on the level of detail desired by the originating carrier. For instance, the ORIG ID may be indicative of customer and IP address but not endpoint (e.g. UA). Alternatively, for example, the originating carrier could hash each component separately and concatenate the component hashes each separated by a "." into a single ORIG ID that could look something like jghf7hh9005476pds376.3diyjhg944k4raa4mn78 where the first string represents the customer and the second string represents the IP Address. One of ordinary skill in the art could readily adapt a hashing scheme to suit a particular purpose.

Suppose, for example, the originating carrier is ABC telecom. When a call is placed by a customer/UA of ABC telecom, it is routed from the customer/UA to an ingress point of the originating carrier network. The originating carrier receives the call (in the form of a SIP INVITE message) including the IP address of the source of the call as well as a UA ID for the endpoint making the call. The originating carrier can then hash the components that identify customer, IP address, and UA ID into an ORIG ID.

When the call makes it way to the inbound customer in the form of a SIP INVITE that includes the ORIG ID, the ORIG ID may be checked against a known database of unwanted ORIG IDs before passing the call to the endpoint. In this example, the inbound call may have the ORIG ID of Zx87&hg$$2j45!p%Rh6#. When compared to the unwanted call database, it may be determined the ORIG ID matches an entry in the unwanted call database such that the call will be rejected, re-routed, or otherwise handled rather than sending to the intended endpoint. The inbound customer can continually add ORIG IDs to the unwanted call ORIG ID database as end users receive unwanted calls and add them to the database.

In another embodiment, the inbound customer can inform their inbound carrier of the ORIG IDs deemed unwanted and the inbound carrier can then inform the originating carrier. The originating carrier may look up the ORIG IDs to determine the customer/end user that placed the call provided they store the hashed ORIG ID values for all combinations of inputs for outbound calls made through their network. If the ORIG IDs have been the subject of prior complaints and depending on the nature of the complaints, the originating carrier can make its own assessment of how to deal with their customer/end user. For instance, if the ORIG IDs are associated with fraudulent activity, the originating carrier may suspend or terminate that customer. However, if the ORIG IDs are associated with legitimate activity that is merely annoying to the called party, the originating carrier may not be inclined to do anything. In such cases, the called party still has the ability to screen those calls with ORIG IDs indicative of an unwanted call.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates an example network architecture 100 according to an embodiment. The network architecture 100 illustrates the infrastructure involved in an end user 117 serviced by a first carrier (Carrier A) network 110 placing a call to an end user 157 serviced by a second carrier (Carrier B) network 120. The terms "end user" and "user agent (UA)" may be used interchangeably to represent the physical device that either initiates a Voice-over Internet Protocol (VoIP) call or receives a VoIP call using Session Initiation Protocol (SIP) signaling. The signaling as represented by the arrows in FIG. 1 only represent the attempted placing of a call using SIP. It does not describe answering the call or establishing the media channel. The disclosure herein is focused on giving a customer 150 of Carrier B 120 the ability to parse the incoming call request (i.e., SIP INVITE) in greater detail to determine how to route the call based on information contained in the ORIG ID that may be requested from Carrier B 120.

A call placed from an originating end user 117 to a destination end user 157 traverses the infrastructure shown in FIG. 1 as follows. In this example, the outbound call request (SIP INVITE) is routed from the end user terminal 117 to an outbound customer 115 of a first carrier (Carrier A) 110. The outbound customer 115 may utilize a private branch exchange (PBX) in conjunction with some other telecom switching apparatus (e.g., an SBC or softswitch) to manage and route calls between end users 117 and Carrier A 110. A session border controller (SBC) is a piece of equipment that sits on the network edge between the telecommunications service provider (e.g., Carrier 110) and the outbound customer 115 that is configured to manage call setup, tear down, and other call handlings. The outbound customer 115 may then route the SIP INVITE to the SBC 112 for Carrier A 110. As an outbound call, Carrier A 110 is obligated to attach an attestation to the call using STIR/SHAKEN before forwarding to the inbound carrier (Carrier B 120). In addition, Carrier A may also create an ORIG ID which may be included in an identity header as part of the SIP INVITE. Inbound Carrier B 120 receives the SIP INVITE and verifies the STIR/SHAKEN certificate via the inbound call handler 126 before forwarding the call to inbound customer 150. The inbound call handler 126 consults a $3^{rd}$ party trusted verification server 130 to verify the STIR/SHAKEN certificate received with the SIP INVITE. At this point, inbound Carrier B 150 determines the attestation level of the STIR/SHAKEN certificate along with other characteristics pertaining to the inbound call. Assuming the inbound call passes the STIR/SHAKEN verification, the call may be passed to the inbound customer 150 and forwarded to end user 157. In addition, the metadata for the call attempt may also be selectively passed in the SIP INVITE header(s) to inbound customer 150 based on preferences of inbound customer 150. According to the embodiments described herein, inbound telecommunication network customers may be given the ability to choose the information they want to receive for inbound calls to their account. The selection of such information may be achieved in a dashboard like customer interface to the carrier network. For example, a section of the carrier dashboard may include the ability to select the level of STIR/SHAKEN and identity header parameters that will be sent to the customer via the SIP INVITE for inbound calls. The selections may be divided, for example, into six (6) categories: (1) none; (2) verification status; (3) enhanced verification status; (4) verification status+identity header; (5) enhanced verification status+identity header; and (6) identity header only.

If the inbound customer 150 selects "none", then no STIR/SHAKEN or identity parameters will be sent with the SIP INVITE from inbound Carrier B 120 to inbound customer 150. In other words, no changes to the basic SIP INVITE are made by inbound Carrier B 120 before forwarding to inbound customer 150. This does not mean that STIR/SHAKEN was not applied to the inbound call just that the customer has opted not to receive any additional information.

If the inbound customer 150 selects "verification status", then inbound call handler 126 may add the verstat (verification status) parameter to the P-Asserted-Identity (PAI) header value to the SIP INVITE to indicate whether the inbound call attempt passed or failed the STIR/SHAKEN validation.

If the inbound customer 150 selects "enhanced verification status", then inbound call handler 126 may add the verstat, attestation level, and ORIG ID parameters to the PAI header to the SIP INVITE to indicate whether the inbound call passed or failed the STIR/SHAKEN validation as well as the attestation level (A, B, or C) of the inbound call attempt. Inbound customer 150 will also receive the ORIG ID string.

If the inbound customer 150 selects "verification status+ identity header", then inbound call handler 126 will amend the PAI header as described above with respect to the verification status parameter and will further include, with the SIP INVITE, an identity header, if any was received from originating outbound Carrier A 110.

If the inbound customer 150 selects "enhanced verification status+identity header", then inbound call handler 126 will amend the PAI header as described above with respect to the enhanced verification status parameters and will further include, with the SIP INVITE, an identity header, if any was received from originating Carrier A 110.

Lastly, if the inbound customer 150 selects "identity header only", then inbound call handler 126 will include the identity header received from originating outbound Carrier A 110, if any, with the SIP INVITE but will not add a PAI header to the SIP INVITE.

The identity header may be added to the SIP INVITE by originating Carrier A 110 and may include fields such as from, to, timestamp, attestation level, ORIG ID, and certification URL. The PAI header may be added to the SIP INVITE by inbound Carrier B 120 based on customer preference and may include many of the same parameters as the identity header.

It should be noted that carriers and customers may both utilize SBCs on the edge of their respective networks to facilitate SIP messaging, call handling, and media connections. In addition, carriers may utilize SBC proxies to further facilitate call handling. For instance, inbound call attempts may be received at Carrier B 120 into an SBC 122 and forwarded to an SBC inbound proxy server 124 for specific handling with the inbound call handler 126. The inbound call handler is a generalized label for other equipment that performs additional call handling functions and interacts with the $3^{rd}$ party trusted verification server for STIR/SHAKEN purposes. The SBC inbound proxy server 124 also serves as the gateway to the inbound customer's 150 SBC 155. Inbound customer SBC 155 performs call handling on behalf of its end users 157.

Figure 2:
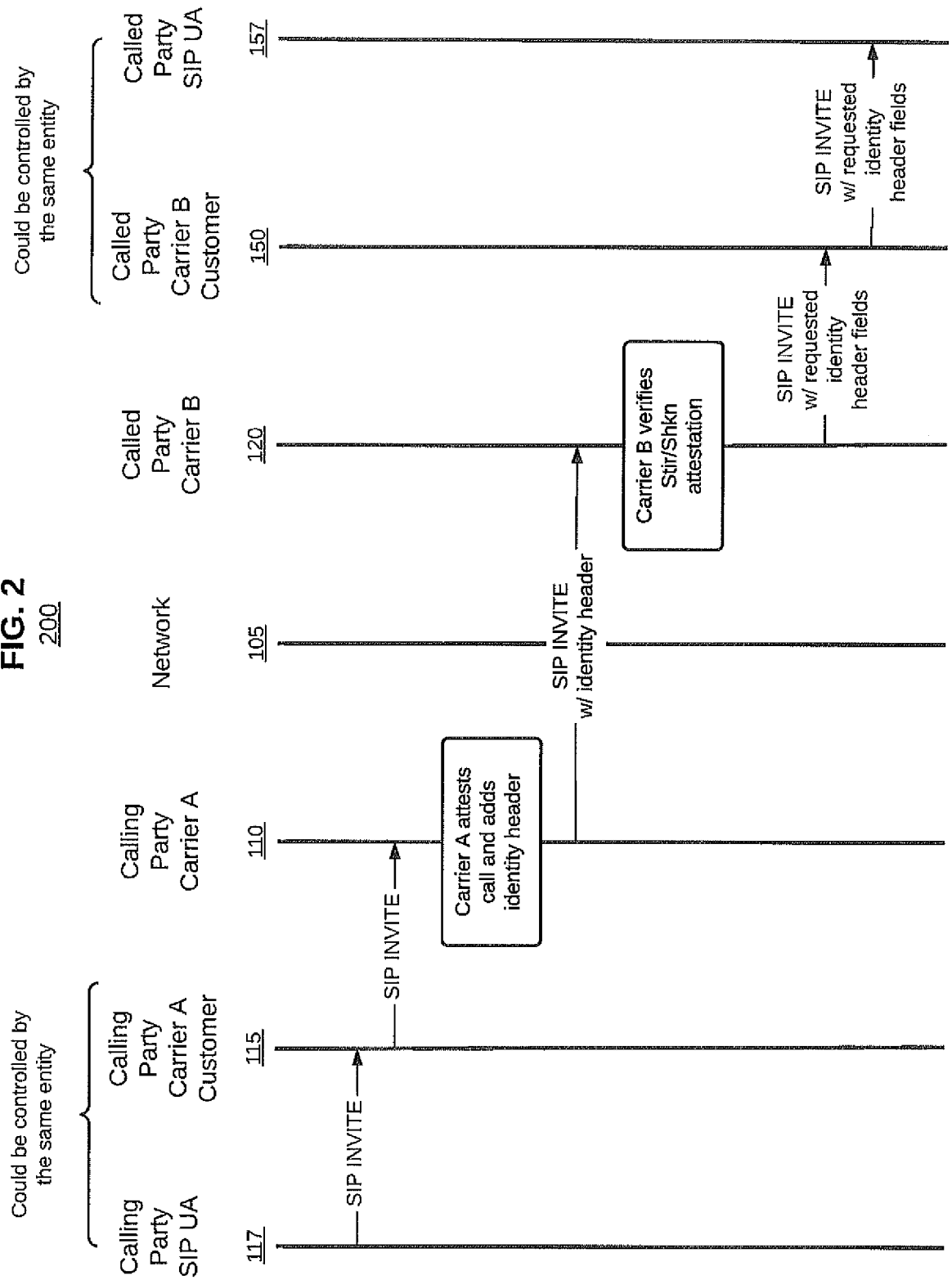
FIG. 2 illustrates a message flow diagram for a SIP based telephone call according to an embodiment.

FIG. 2 illustrates a message flow diagram 200 for a SIP based telephone call according to an embodiment. This message flow may be representative of some or all of the operations executed by one or more logic, features, or devices described herein, such as any devices or systems described above with references to other figures herein. In the illustrated examples shown in FIG. 2, the message flow 200 may comprise one or more messages or processes involved in allocating and managing resources in a communications network as described elsewhere herein. The embodiments, however, are not limited to the number, type, order or arrangement of messages shown in FIG. 2.

In this example, on the outbound side, an outbound carrier 110 has contracted to provide outbound calling services to an outbound customer 115 where the outbound customer 115 may have multiple end users 117 capable of utilizing the outbound calling services. The outbound customer 115 may deploy its own telecom infrastructure in the form of a private branch exchange (PBX) system, softswitch, or the like. If the customer is large enough, they may also deploy their own SBC to manage larger call volumes and call routings. The outbound customer 115 interfaces their telecom infrastructure with that of their outbound carrier 110. On the inbound side, an inbound carrier 120 receives the call attempt and processes it on behalf of their inbound customer 150.

The message flow 200 starts with a calling party end user 117 attempting to place a call. In dialing out, a SIP INVITE message is created and forwarded from the end user device 117 to call handling apparatus for the outbound customer 115 of Carrier A 110. The call handling apparatus may be a softswitch, a PBX system, an SBC, or a combination thereof. The SIP INVITE is then relayed to Carrier A 110 where it undergoes additional processing. Specifically, it undergoes STIR/SHAKEN certification where it will receive a certificate in the form of a URL accessible to the receiving carrier). In this example, Carrier A 110 may also add an identity header to the SIP INVITE and send it through one or more intermediate hops until it arrives at the destination carrier—Carrier B 120 in this case. Carrier B 120 will first access the certificate URL to query a trusted $3^{rd}$ party verification server to verify the attestation level associated with the SIP INVITE.

At this point, Carrier A 110 and Carrier B 120 have performed the required STIR/SHAKEN certification process as it pertains to the SIP INVITE. Carrier B 120 may provide additional services for its inbound calling customer 150 allowing it to customize the amount and type of data they receive with the SIP INVITE. An example of this process has been described above. Carrier B 120 will amend the SIP INVITE according to the customization requested by its inbound customer 150 and forward it on to the telecom infrastructure of inbound customer 150. As previously described, this could be an SBC or softswitch. Inbound customer 150 may manage multiple end users 157, one of which is the intended recipient of the SIP INVITE. Inbound customer 150 may then route the SIP INVITE to the appropriate end user.

Figure 3:
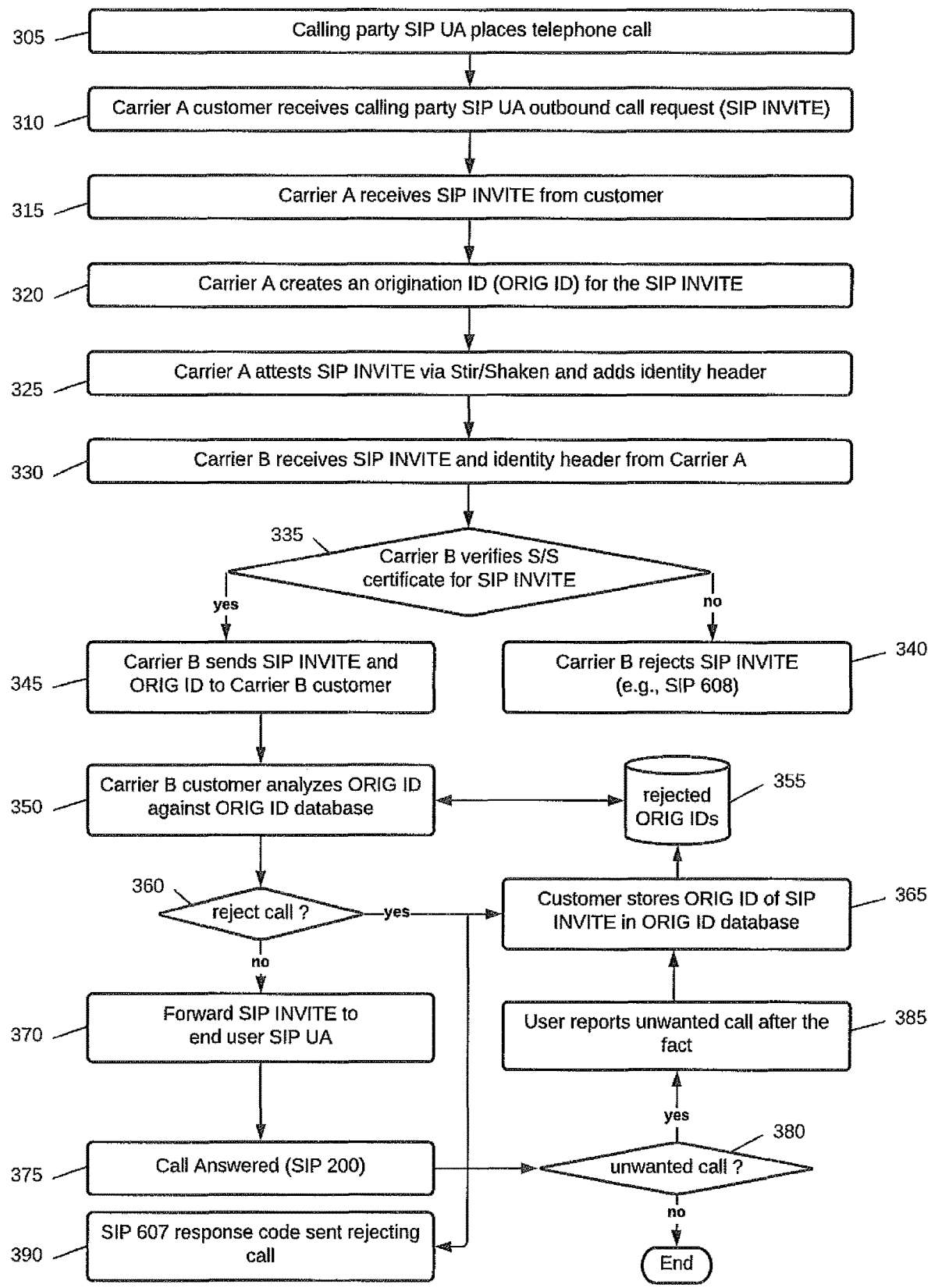
FIG. 3 illustrates a first logic flow diagram according to an embodiment.

FIG. 3 illustrates a first logic flow diagram 300 for processing a SIP INVITE according to an embodiment. This message flow may be representative of some or all of the operations executed by one or more logic, features, or devices described herein, such as any devices or systems described above with references to other figures herein. In the illustrated examples shown in FIG. 3, the logic flow 300 may comprise one or more steps or processes involved in allocating and managing resources in a communications network as described elsewhere herein. The embodiments, however, are not limited to the number, type, order or arrangement of steps shown in FIG. 3.

Logic flow 300 begins with a calling party end user 117 attempting to place a telephone call at step 305. For instance, the end user may utilize a SIP user agent (UA) or other SIP enabled device 117 to initiate an outbound call to a telephone number. The UA 117 operated by the calling party may be associated with outbound calling services for an outbound customer 115 of a carrier (i.e., Carrier A 110). The attempted outbound telephone call starts as a SIP INVITE message from the UA 117 to a called party UA 157 as identified by their respective telephone numbers. The outbound customer 115 receives the SIP INVITE from the UA 117 into a softswitch, SBC, or other SIP call handling apparatus (i.e., customer telecom infrastructure) at step 310. The inbound customer 115 telecom infrastructure may then relay the SIP INVITE to Carrier A 110 where it is received by Carrier A's telecom infrastructure 112 at step 315. Carrier A 110 performs at least two tasks upon receipt of the SIP INVITE including creating an origination ID (ORIG ID) at step 320 and creating a STIR/SHAKEN certificate at step 325. In addition, Carrier A 110 may then add an identity header that includes the ORIG ID to the SIP INVITE before sending to a destination carrier (i.e., Carrier B 120).

Carrier B 120 receives the SIP INVITE and identity header at step 330. Carrier B 120 receives the SIP INVITE via an SBC 122 and forwards to an SBC proxy 124. SBC proxy forwards the SIP INVITE to an inbound call handler 126 configured to process the SIP INVITE including verification of the STIR/SHAKEN certificate received in the SIP INVITE at decision block 335. As previously described, STIR/SHAKEN verification involves accessing a trusted $3^{rd}$ party verification server 130 to ensure the received certificate URL is indeed valid. If the SIP INVITE fails the STIR/SHAKEN verification, Carrier B 120 will reject the call with a SIP 4XX message (global response failure) or the like at step 340 and the call attempt will be terminated. If the SIP INVITES passes STIR/SHAKEN certification at decision block 335, Carrier B 120 may then send the SIP INVITE with ORIG ID to inbound customer 150 at step 345. For instance, inbound customer 150 may have interacted with Carrier B 120 to customize the information it receives with each SIP INVITE. The level of customization may determine how much additional information regarding the source of the SIP INVITE is conveyed to inbound customer 150 as described earlier.

In one embodiment, the inbound customer 150 may have opted to receive data that includes the ORIG ID associated with the SIP INVITE. Inbound customer 150 may then analyze the ORIG ID against a database 355 of unwanted ORIG IDs in step 350. For example, the ORIG ID associated with the pending SIP INVITE may be compared to all other ORIG IDs stored in database 355. The character string that comprises an ORIG ID may be hashed in some manner and may appear to be random. The ORIG IDs, while not providing any information that could specifically identify the caller, may nevertheless be useful in keeping track of unwanted inbound calls.

If the analysis (decision block 360) of the ORIG ID of the SIP INVITE reveals an ORIG ID that is identical to an ORIG ID in database 355, the SIP INVITE may be rejected in step 390 by sending, for instance, a SIP 607 response (unwanted call). In addition, the present ORIG ID may then be added to database 355 in step 365.

If the ORIG ID analysis reveals that the current ORIG ID does not match any of the ORIG IDs in database 355 in decision block 360, inbound customer 150 may then forward the SIP INVITE to the intended user agent (UA) device 157 in step 370. The call represented by the SIP INVITE may then be answered at the UA device 157 as represented by a SIP 200 message in step 375. Upon completion of the call, the end user may make a determination (decision block 380) whether the call was unwanted. If the call has been determined as unwanted, the end user may flag it as such in step 385. Once flagged as unwanted, the ORIG ID of the call (as determined from the SIP INVITE) may be entered into database 355 in step 365. This ensures that unwanted calls with ORIG IDs that do not match any currently stored ORIG IDs get added to the database so that subsequent calls with ';ORIG IDs may be analyzed against an updated database 355.

Figure 4:
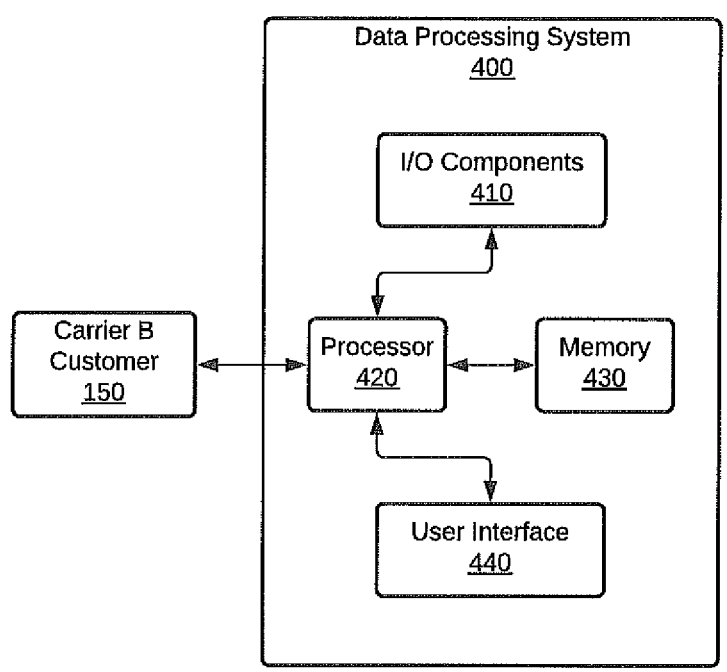
FIG. 4 illustrates an example of a computer based data processing system.

FIG. 4 illustrates an example of a computer based data processing system 400 suitable for use with any of the examples described above. Although the example data processing system 400 is shown as in communication with a messaging service provider 150 in accordance with embodiments of the present inventive concept, the data processing system 400 may also be part of the Carrier B inbound customer 150 without departing from the scope of the present inventive concept. In some examples, the data processing system 400 can be any suitable computing device for performing operations according to the embodiments discussed herein described herein.

As illustrated, the data processing system 400 includes a processor 420 communicatively coupled to I/O components 410, a user interface 440 and a memory 430. The processor 420 can include one or more commercially available processors, embedded processors, secure processors, microprocessors, dual microprocessors, multi-core processors, other multi-processor architectures, another suitable processing device, or any combination of these. The memory 430, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 420.

I/O components 410 may be used to facilitate wired or wireless connections to devices such as one or more displays, game controllers, keyboards, mice, joysticks, cameras, buttons, speakers, microphones and/or other hardware used to input or output data. Memory 430 represents non-volatile storages such as magnetic, optical, or other storage media included in the data processing system and/or coupled to processor 420.

The user interface 440 may include, for example, a keyboard, keypad, touchpad, voice activation circuit, display or the like and the processor 420 may execute program code or instructions stored in memory 430.

It should be appreciated that data processing system 400 may also include additional processors, additional storage, and a computer-readable medium (not shown). The processor(s) 420 may execute additional computer-executable program instructions stored in memory 430. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims may reflect, inventive subject matter may lie in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims.

The invention claimed is:

1. A method, comprising;
at an inbound customer call handling apparatus:
receiving a SIP INVITE from a destination carrier servicing the inbound customer intended for a destination user agent (UA) device of the inbound customer, the SIP INVITE including a current origination identifier (ORIG ID) comprised of a fixed length character string generated from a hashing algorithm based on a specified set of inputs that include a customer identifier, an Internet Protocol (IP) address indicative of the point of ingress into the originating carrier's network, and an ID indicative of the UA device that initiated the SIP INVITE;
accessing a database of stored ORIG ID character strings, each stored ORIG ID character string in the database having been included with a previous SIP INVITE that has been associated with an unwanted inbound call;

analyzing the current ORIG ID character string to determine if it matches any stored ORIG ID character strings in the database;

when there is a match to a stored ORIG ID character string, not forwarding the SIP INVITE to the destination UA device; and when there is not a match to a stored ORIG ID character string, forwarding the SIP INVITE to the destination UA device.

2. The method of claim 1, wherein the ORIG ID character string was created by an originating carrier responsible for sending the SIP INVITE on behalf of a UA device that originated the SIP INVITE.

3. The method of claim 1 comprising:

when the SIP INVITE associated with the current ORIG ID character string that resulted in a completed call turned out to be an unwanted call, adding the current ORIG ID character string to the database of stored ORIG ID character strings.

4. At least one non-transitory machine-readable medium comprising a set of instructions executable on at least one computing device, the set of instructions to:

receive a SIP INVITE from a destination carrier servicing an inbound customer intended for a destination user agent (UA) device of the inbound customer, the SIP INVITE including a current origination identifier (ORIG ID) comprised of a fixed length character string generated from a hashing algorithm based on a specified set of inputs that include a customer identifier, an Internet Protocol (IP) address indicative of the point of ingress into the originating carrier's network, and an ID indicative of the UA device that initiated the SIP INVITE;

access a database of stored ORIG ID character strings, each stored ORIG ID character string in the database having been included with a previous SIP INVITE that has been associated with an unwanted inbound call;

analyze the current ORIG ID character string to determine if it matches any stored ORIG ID character strings in the database;

when there is a match to a stored ORIG ID character string, not forward the SIP INVITE to the destination UA device; and when there is not a match to a stored ORIG ID character string, forward the SIP INVITE to the destination UA device.

5. The non-transitory machine-readable medium of claim 4, wherein the ORIG ID character string was created by an originating carrier responsible for sending the SIP INVITE on behalf of a UA device that originated the SIP INVITE.

6. The non-transitory machine-readable medium of claim 4, the set of instructions executable on the at least one computing device to:

when the SIP INVITE associated with the current ORIG ID character string that resulted in a completed call turned out to be an unwanted call, add the current ORIG ID character string to the database of stored ORIG ID character strings.

7. A computer, comprising:

one or more processors; and a non-transitory computer readable medium to store a set of instructions executable by the one or more processors, the set of instructions to cause the one or more processors to:

receive a SIP INVITE from a destination carrier servicing an inbound customer intended for a destination user agent (UA) device of the inbound customer, the SIP INVITE including a current origination identifier (ORIG ID) comprised of a fixed length character string generated from a hashing algorithm based on a specified set of inputs that include a customer identifier, an Internet Protocol (IP) address indicative of the point of ingress into the originating carrier's network, and an ID indicative of the UA device that initiated the SIP INVITE;

access a database of stored ORIG ID character strings, each stored ORIG ID character string in the database having been included with a previous SIP INVITE that has been associated with an unwanted inbound call;

analyze the current ORIG ID character string to determine if it matches any stored ORIG ID character strings in the database;

when there is a match to a stored ORIG ID character string, not forward the SIP INVITE to the destination UA device; and when there is not a match to a stored ORIG ID character string, forward the SIP INVITE to the destination UA device.

8. The computer of claim 7, wherein the ORIG ID character string was created by an originating carrier responsible for sending the SIP INVITE on behalf of a UA device that originated the SIP INVITE.

9. The computer of claim 7, the set of instructions executable on the at least one computing device to:

when the SIP INVITE associated with the current ORIG ID character string that resulted in a completed call turned out to be an unwanted call, add the current ORIG ID character string to the database of stored ORIG ID character strings.

* * * * *